G. BREAULT.
MEANS FOR RAISING SUNKEN VESSELS.
APPLICATION FILED AUG. 10, 1916.
1,250,787.
Patented Dec. 18, 1917.
4 SHEETS—SHEET 1.
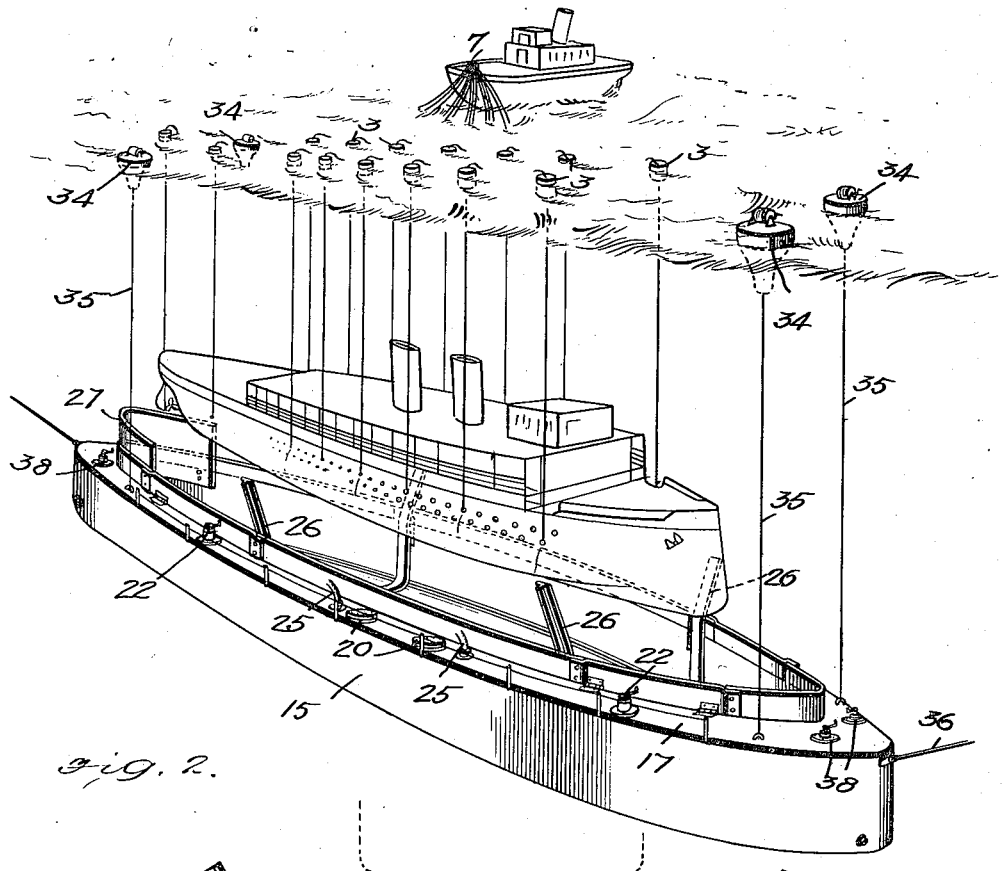
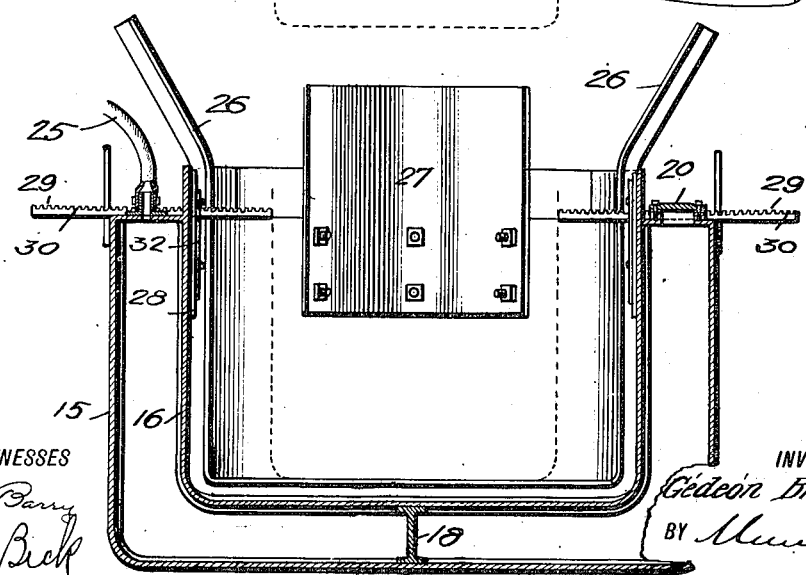
WITNESSES
INVENTOR
Gideon Breault
BY
ATTORNEYS G. BREAULT.
MEANS FOR RAISING SUNKEN VESSELS.
APPLICATION FILED AUG. 10, 1916.
1,250,787.
Patented Dec. 18, 1917.
4 SHEETS—SHEET 2.
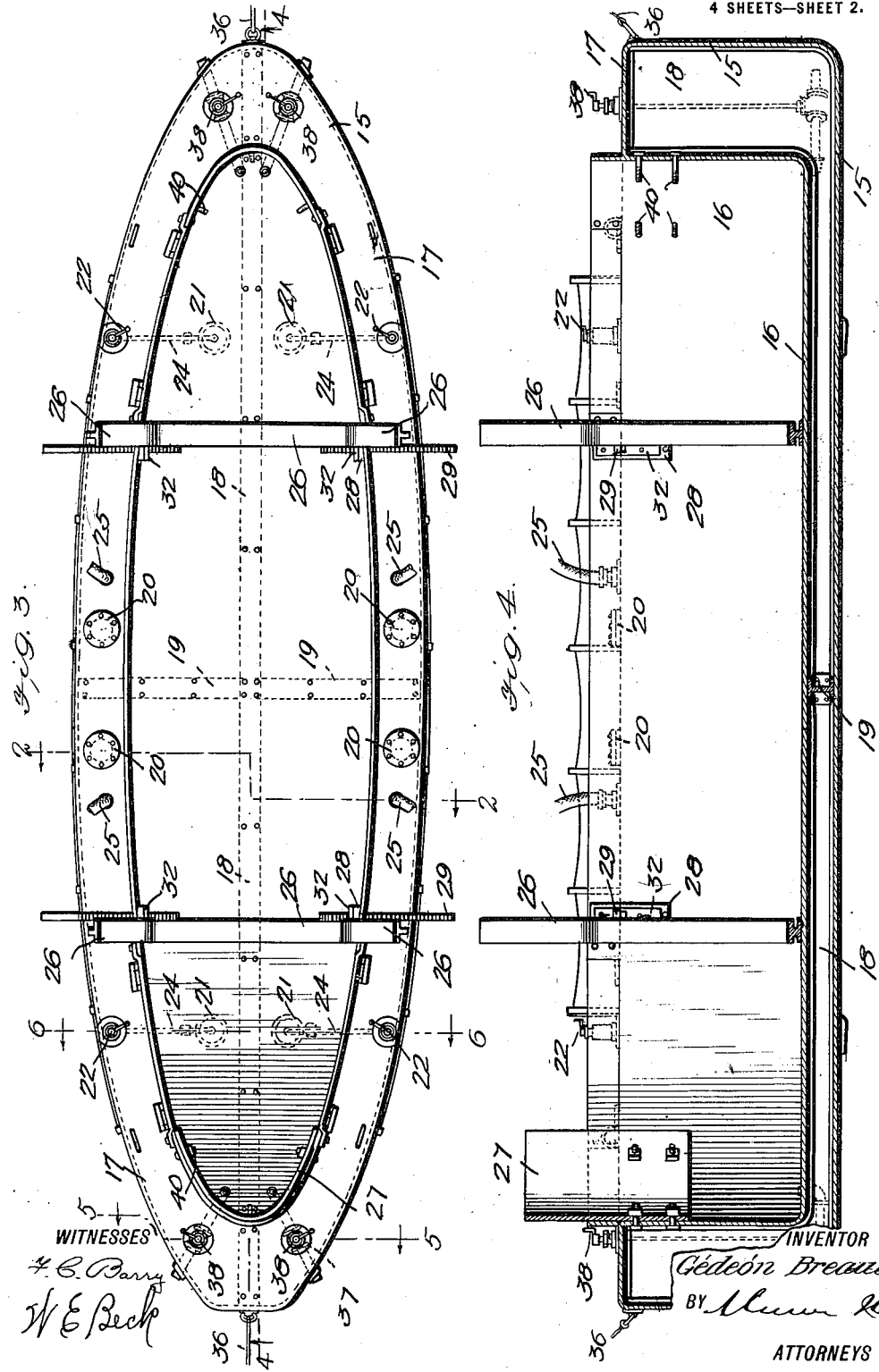
WITNESSES
F. C. Barry
W. E. Beck
INVENTOR
Gédeón Breault
BY
ATTORNEYS

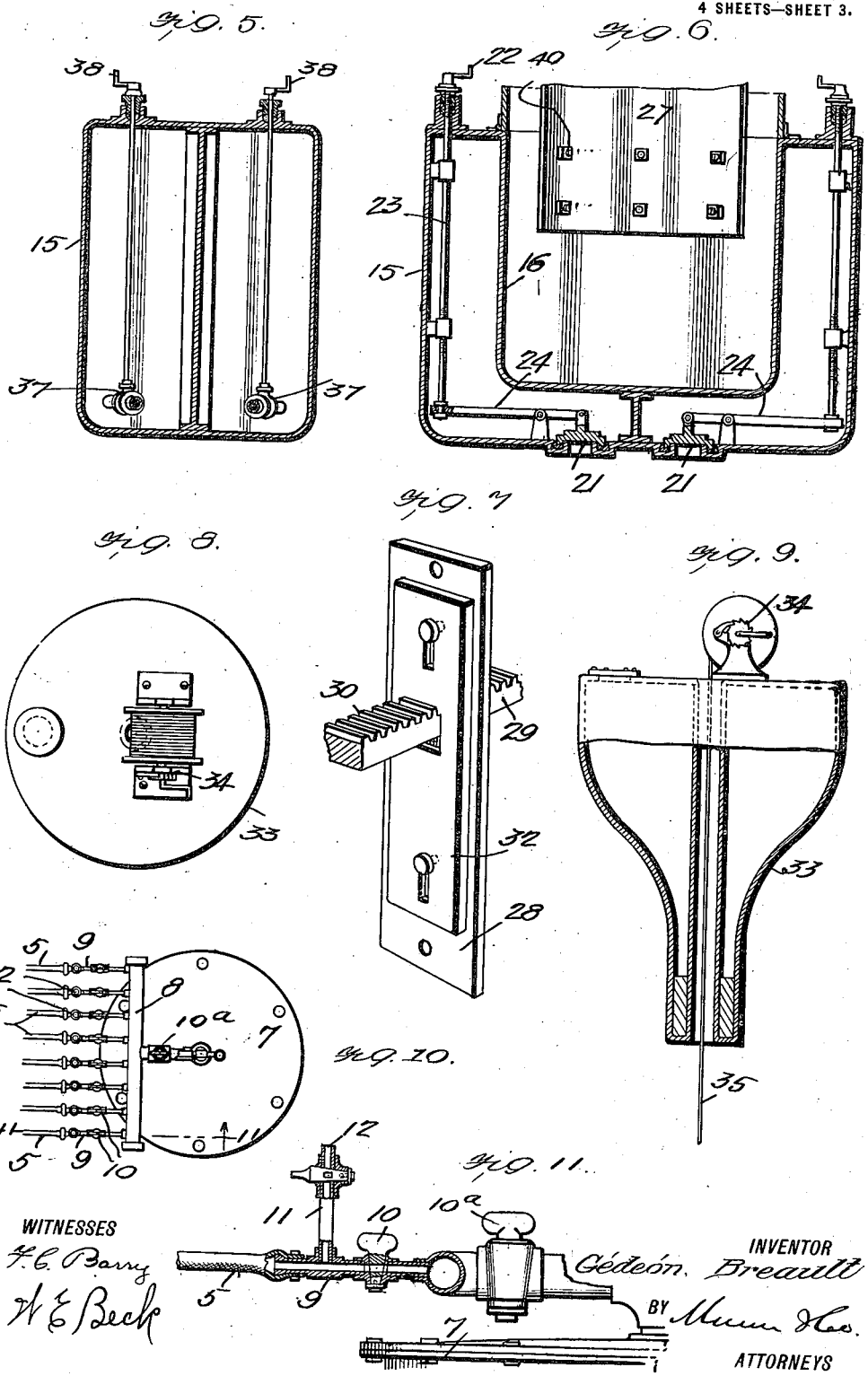

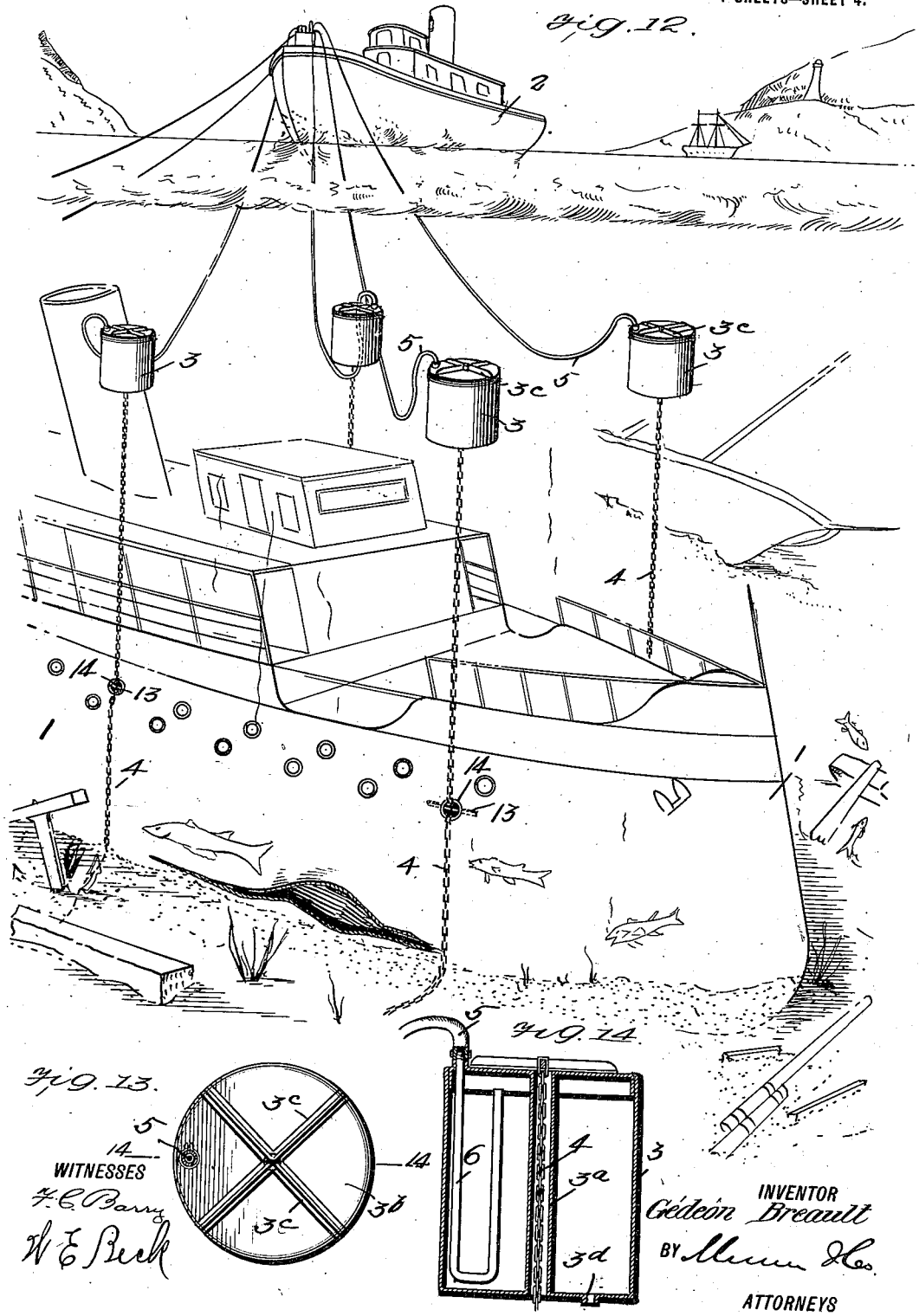

UNITED STATES PATENT OFFICE.

GÉDÉON BREAULT, OF PAWTUCKET, RHODE ISLAND.

MEANS FOR RAISING SUNKEN VESSELS.

1,250,787.  Specification of Letters Patent.  Patented Dec. 18, 1917.

Application filed August 10, 1916. Serial No. 114,207.

*To all whom it may concern:*

Be it known that I, GÉDÉON BREAULT, a citizen of the United States, and a resident of Pawtucket, in the county of Providence and State of Rhode Island, have invented a certain new and useful Improvement in Means for Raising Sunken Vessels, of which the following is a specification.

My invention relates to improvements in means for raising sunken vessels, and it consists in the combinations, constructions, and arrangements herein described and claimed.

An object of my invention is to provide a device by means of which a sunken vessel may be quickly and economically raised and can be towed into port.

A further object of my invention is to provide means for raising sunken vessels including a dry dock which is submersible and which can be thereafter emptied of water so as to permit the repair of the vessel.

A further object of my invention is to provide a means for raising sunken vessels including a dry dock which is capable of holding vessels of varying sizes, being provided with adjustable stays or braces for engaging the vessel.

A further object of my invention is to provide a novel form of float.

Other objects and advantages will appear in the following specification, and the novel features of the invention will be particularly pointed out in the appended claims.

My invention is illustrated in the accompanying drawings forming part of this application, in which:

Figure 1 is a perspective view showing the submersible dry dock in position underneath the vessel which is being floated.

Fig. 2 is a section of the dock on the line 2—2 of Fig. 3.

Fig. 3 is a plan view of the dry dock.

Fig. 4 is a longitudinal section on the line 4—4 of Fig. 3.

Fig. 5 is a section on the line 5—5 of Fig. 3.

Fig. 6 is a section on the line 6—6 of Fig. 3.

Fig. 7 is a perspective view of one of the adjustable stays.

Fig. 8 is a plan view of a float used in connection with the dry dock.

Fig. 9 is a vertical section through the float shown in Fig. 8.

Fig. 10 is a plan view of an air reservoir and the connections thereto.

Fig. 11 is a section along the line 11—11 of Fig. 10.

Fig. 12 is a perspective view showing the float as applied to the sunken vessel.

Fig. 13 is a plan view of one of the floats shown in Fig. 12.

Fig. 14 is a section along the line 14—14 of Fig. 13.

Referring now particularly to Figs. 12 to 14 inclusive, I have shown therein a sunken vessel 1 and a boat 2 which is in the act of raising the sunken vessel. The actual means for moving the vessel consists of a series of floats, such as those shown at 3. Each of these floats is of the construction shown in Figs. 13 and 14. The float 3 has a central tube 3ª which runs from the bottom to the top. The top 3ᵇ is braced by cross braces 3ᶜ. To the latter is secured a chain 4, this chain extending through the tube 3ª and downwardly in the water. At 5 I have shown a flexible tube which communicates with a U-shaped pipe 6 within the float 3. It will be observed from Fig. 14 that the end of this pipe terminates short of the top, for a reason which will be explained hereafter.

In connection with the float 3 I make use of an air reservoir like that shown in Figs. 10 and 11. This consists of a casing 7 with which a manifold 8 communicates. The flexible tubes 5 are secured to the end of a pipe 9 which is provided with a valve 10 and with an outlet pipe 11 provided with a valve 12. As will be seen from Fig. 10, there is one of these pipes 9 for every flexible pipe or tube 5, a cut-off valve 10ª being provided between the casing 7 and the manifold 8.

In raising the vessel the stop cock 10 is closed, and the stop cock 12 is opened. Water will now begin to enter the bottom of each of the floats 3 through the openings 3ᵇ, see Fig. 14, thereby causing the float to sink. Chains 4 may now be secured to any suitable part of the vessel, as for instance, to a bar 13 thrust through the port holes 14, and after all of the floats have been so secured the cocks 12 are closed and the cocks 10 are opened, thereby permitting the compressed air from the reservoir 7 to pass through the tubes into the interior of the float 3, thereby driving the water out and causing the float to rise. It should be stated the float 3 is not entirely full of water. It will fill with water up to the top of the short arm of the U-shaped tube. The water, however, forms an air seal which prevents further filling of the float with water. There is thus left an air space, so that the float will always maintain an upright position, due to the fact that the lower end is heavier than the upper.

Now it may be desirable to raise one end of the boat first, and if so, the float at this end may be manipulated first. When the air is pumped in to a sufficient degree to permit the float to rise, the vessel will be raised into the position shown in Fig. 1, where it will be kept suspended by the float 3.

The dry dock which forms the main feature of the invention consists of an outer hull 15 and an inner wall 16 spaced from the hull and held in spaced relation by a deck 17 and longitudinal partitions 18 and transverse partitions 19. These longitudinal and transverse partitions divide the space between the inner and the outer walls into four compartments, which are air-tight, each compartment being provided with a manhole, such as that shown at 20, and with a valve 21, which is operated by a handle 22 arranged to operate the valve rod 23. In the present instance I have shown this rod as operating a lever 24, see Fig. 6, to which the valve 21 is attached, but it will be understood that this is merely a diagrammatic showing, and that any suitable form of valve operating means might be employed without departing from the spirit of the invention. In addition to the valve 21, each compartment is provided with an air tube 25 which communicates with a suitable source of compressed air, as for instance that shown in Figs. 10 and 11.

At 26 I have shown U-shaped supports whose upper ends flare outwardly for the purpose of guiding the dock so as to center it with respect to the vessel to be raised. Near one end of the dock is an arc-shaped abutment. On the opposite side of the dock are adjustable stays or bracing members so as to accommodate vessels of various sizes. In Fig. 7 I have shown the preferred manner of constructing these adjustable members. A plate 28 is secured to the inner side of the casing wall 16, this plate being provided with an opening whose lower edges rest on a level with the deck 17. The stays 29 have rack teeth 30 on their upper sides.

Slidably secured to the plate 28 are locking plates like that shown at 32 in Fig. 7. The use of the dry dock in raising the vessel is as follows: Floats 33 like that shown in Fig. 9 are provided with windlasses 34 whose cables 35 are secured to the dry dock in the manner shown in Fig. 1. The handles 22 are turned, thereby opening the valve 21, and water enters the space between the inner and outer walls 15 and 16 until the dry dock is in sinking condition. The latter is now lowered by means of the windlasses 34, until the dock is at a lower depth than the vessel. It may now be towed underneath the vessel, by means of the tow line 36, see Fig. 1, and when underneath the vessel it may be slightly raised until the abutment member 27 is in position to engage the vessel from the rear. This abutment 27 is merely for the purpose of indicating when the dry dock is in position to receive the vessel, since when it is pulled forwardly with the tow line 36, the engagement of the abutment 27 with the rear end of the vessel gives the proper indication. Air is now forced into the four compartments, and the water passes out at the bottom, the dock rises, and the guides 26 guide the dock in position so as to center the vessel. As the dock rises the vessel will emerge from the water, and the water on the interior of the dock may be withdrawn by opening the valves 37, see Figs. 5 and 3, through the manipulation of the handle 38. The vessel now sinks into position, the stays 30 being previously adjusted by pushing them forwardly to the proper position and then permitting the locking plate 32 to engage the teeth 30 so as to lock the stays in position.

Air can now be forced into the dry dock to cause a greater buoyancy so that the floats holding the same may be removed, as well as those floats holding the vessel. The dry dock can now be towed to a suitable position for repairing the vessel, or may be anchored and the vessel may be repaired, or anywhere the water is calm enough to permit it.

Instead of putting the abutment at the end shown in Fig. 3, it may be placed at the opposite end, and bolts 40, see Fig. 4, are provided for this purpose.

I claim:—

1. A floating dry dock comprising an outer hull, an inner casing spaced from the hull, a deck holding the inner casing in spaced relation, partitions for dividing the space between the hull and the inner casing into compartments, a valve for permitting the entrance or exit of water from each compartment, means for operating each of said valves individually, means for forcing compressed air into or permitting the withdrawal of air from each compartment individually, and U-shaped guide members spaced within the inner wall, the upper ends of said U-shaped guide members being outwardly flared.

2. A floating dry dock comprising an outer hull, an inner casing spaced from the hull, a deck holding the inner casing in spaced relation, partitions for dividing the space between the hull and the inner casing into compartments, a valve for permitting the entrance or exit of water from each compartment, means for operating each of said valves individually, means for forcing compressed air into or permitting the withdrawal of air from each compartment individually, U-shaped guide members spaced within the inner wall, the upper ends of said U-shaped guide members being outwardly flared, and an abutment member extending upwardly from said inner wall at one end of the dock.

3. A floating dry dock comprising an outer hull, an inner casing spaced from the hull, a deck holding the inner casing in spaced relation, partitions for dividing the space between the hull and the inner casing into compartments, a valve for permitting the entrance or exit of water from each compartment, means for operating each of said valves individually, means for forcing compressed air into or permitting the withdrawal of air from each compartment individually, U-shaped guide members spaced within the inner wall, the upper ends of said U-shaped guide members being outwardly flared, and an abutment member extending upwardly from said inner wall at one end of the dock, and adjustable stays carried by the dock for accommodating vessels of various sizes.

4. A floating dry dock comprising an outer hull, an inner casing spaced from the hull, a deck holding the inner casing in spaced relation, partitions for dividing the space between the hull and the inner casing into compartments, a valve for permitting the entrance or exit of water from each compartment, means for operating each of said valves individually, means for forcing compressed air into or permitting the withdrawal of air from each compartment individually, U-shaped guide members spaced within the inner wall, the upper ends of said U-shaped guide members being outwardly flared, an abutment member extending upwardly from said inner wall at one end of the dock, and adjustable stays carried by the dock for accommodating vessels of various sizes, said adjustable stays comprising members slidably disposed on the deck and movable transversely with respect to the axis of the dock, and means for locking the stays in their shifted position.

GÉDÉON BREAULT.

Witnesses:
CHARLES H. PETIT,
JOSEPH H. GEUDRON.